United States Patent [19]

Heo

[11] Patent Number: 4,628,351

[45] Date of Patent: Dec. 9, 1986

[54] COOKING APPARATUS WITH A VIDEO DISPLAY

[75] Inventor: Man Y. Heo, Daegu, Rep. of Korea

[73] Assignee: Samsung Electronics Co., Ltd., Rep. of Korea

[21] Appl. No.: 603,138

[22] Filed: Apr. 23, 1984

[51] Int. Cl.$^4$ .......................................... H04N 5/645
[52] U.S. Cl. ...................................... 358/93; 358/181; 358/254; 219/506; 219/10.55 B; 340/706; 340/711
[58] Field of Search ............... 358/93, 254, 181; 340/711, 712, 717, 706; 219/10.55 M, 10.55 R, 10.55 E, 10.55 B, 506; D7/351; D14/79

[56] References Cited

U.S. PATENT DOCUMENTS

| | | | |
|---|---|---|---|
| D. 273,836 | 5/1984 | Ohyama et al. | D7/351 |
| 3,484,548 | 12/1969 | Kowal et al. | 358/181 |
| 3,641,266 | 2/1972 | Stults et al. | 340/717 X |
| 3,757,037 | 9/1973 | Bialek | 340/711 X |
| 4,309,584 | 1/1982 | Terakami | 219/10.55 R X |
| 4,340,799 | 7/1982 | Ueda et al. | 219/10.55 R X |
| 4,396,941 | 8/1983 | Nishimura et al. | 358/254 X |
| 4,459,449 | 7/1984 | Hirata | 219/10.55 R X |

OTHER PUBLICATIONS

"Television Does Everything but the Cooking"; Radio Electronics; Jun. 1951, p. 102.

*Primary Examiner*—Howard W. Britton
*Assistant Examiner*—Victor R. Kostak
*Attorney, Agent, or Firm*—Jordan B. Bierman

[57] ABSTRACT

The present invention is constructed with a TV processing stage (1), a camera-image processing stage (2), a micom-video processing stage (3), an image-processing stage (4) and a switching state (5) on the cooking apparatus. Therefore the user can watch TV programs and can observe selected area through video cameras without leaving the cooking area. The user can also identify the automatic cooking information on TV screen. The micom-video processing state (3) performs a converting function that converts the stored cooking information data into a video signal.

3 Claims, 6 Drawing Figures

COOKING APPARATUS WITH A VIDEO DISPLAY

BACKGROUND OF THE INVENTION

1. Field of the Invention

The present invention relates to a cooking apparatus with a video display. More specifically, the present invention relates to a cooking apparatus on which the users can watch TV programs during cooking, and can observe visitors by monitoring the video signal from video cameras, and can also visually recognize cooking information which is stored in the microprocessor through the TV screen.

2. Description of the Prior Art

Because of the automation of various machines and apparatuses, people have been provided with greater convenience and leisure time, as they no longer have to perform tasks the old fashioned way.

For an example of the old fashioned way, consider a conventional cooking apparatus. It usually required the close surveillance by the operator and also the use of extra aids, such as thermometers and timers to indicate when food is to be cooked.

A conventional oven also cannot help the operator avoid interruptions. For instance, if the doorbell rings, the operator would usually have to leave the cooking area to see who is visiting.

SUMMARY OF THE INVENTION

The present invention is an improvement of conventional apparatus. The present invention includes a video signal processing unit in the cooking apparatus. It is able to process TV programs, video signals from video cameras from any desired location (such as an outside entrance or infant's room) and cooking information stored in the microprocessor.

Therefore the users can watch TV programs while cooking and also monitor visitors without leaving the cooking area. It also enables the user to monitor the state of automatic cooking information which was previously selected.

DETAILED DESCRIPTION OF THE PRESENT INVENTION

The following detailed explanation describes a microwave oven which is a preferred embodiment of the present invention. However, it must be clear that the present invention is not limited to a microwave oven but can be employed as another type of cooking apparatus (e.g. gas oven, electric roaster, electric oven, electric grill, etc.).

Figure 2:
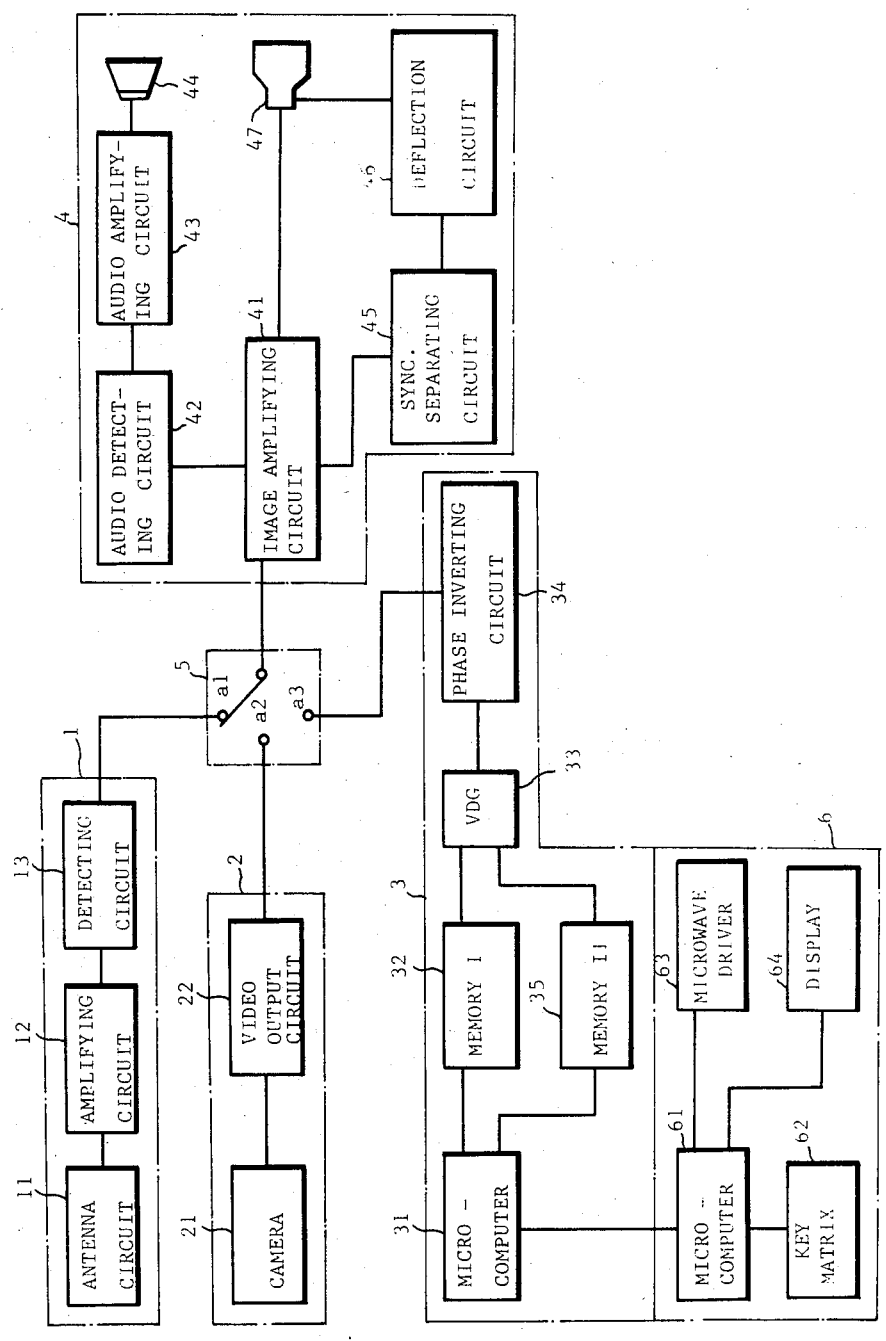
FIG. 2 is a block-diagram of the present invention.

FIG. 2 shows the constitution of the present invention embodied in a microwave oven.

The TV processing stage(1) is comprised of an antenna circuit(11), an amplifying circuit(12) and a detecting circuit(13).

The camera-image processing stage(2) which is for monitoring visitors is comprised of a camera(21) and a video output circuit(22).

The micom-video processing stage(3) which is for visually indicating the cooking information is comprised of a memory I(32) which stores the cooking information temporarily, a memory II(35) which stores the cooking information permanently. A microcomputer 31, a video display generator 33 (VDG) such as Motorola's IC Mc 6847, and a phase inverting circuit 34. The input port of the microcomputer(31) is connected to the microwave oven circuit(6) which is comprised of a microcomputer(61), a key matrix(62), a microwave driver(63) and a display(64). This microwave oven circuit(6) is a heat-controlling means.

Switching stage 5 includes terminals(a1)(a2)(a3) which are connected to the outputs of the TV processing stage(1), the camera-image processing stage(2) and the micom-video processing stage(3) correspondingly. The switching stage(5) also includes a moving switch which can be connected to said terminals (a1)(a2)(a3) selectively.

Said switching stage(5) is connected to the conventional image-processing stage(4) which is comprised of an image amplifying circuit(41), an audio detecting circuit(42), an audio amplifying circuit(43), a speaker(44), a sync. separating circuit(45), a deflection circuit(46) and a Braun tube(47).

Figure 3:
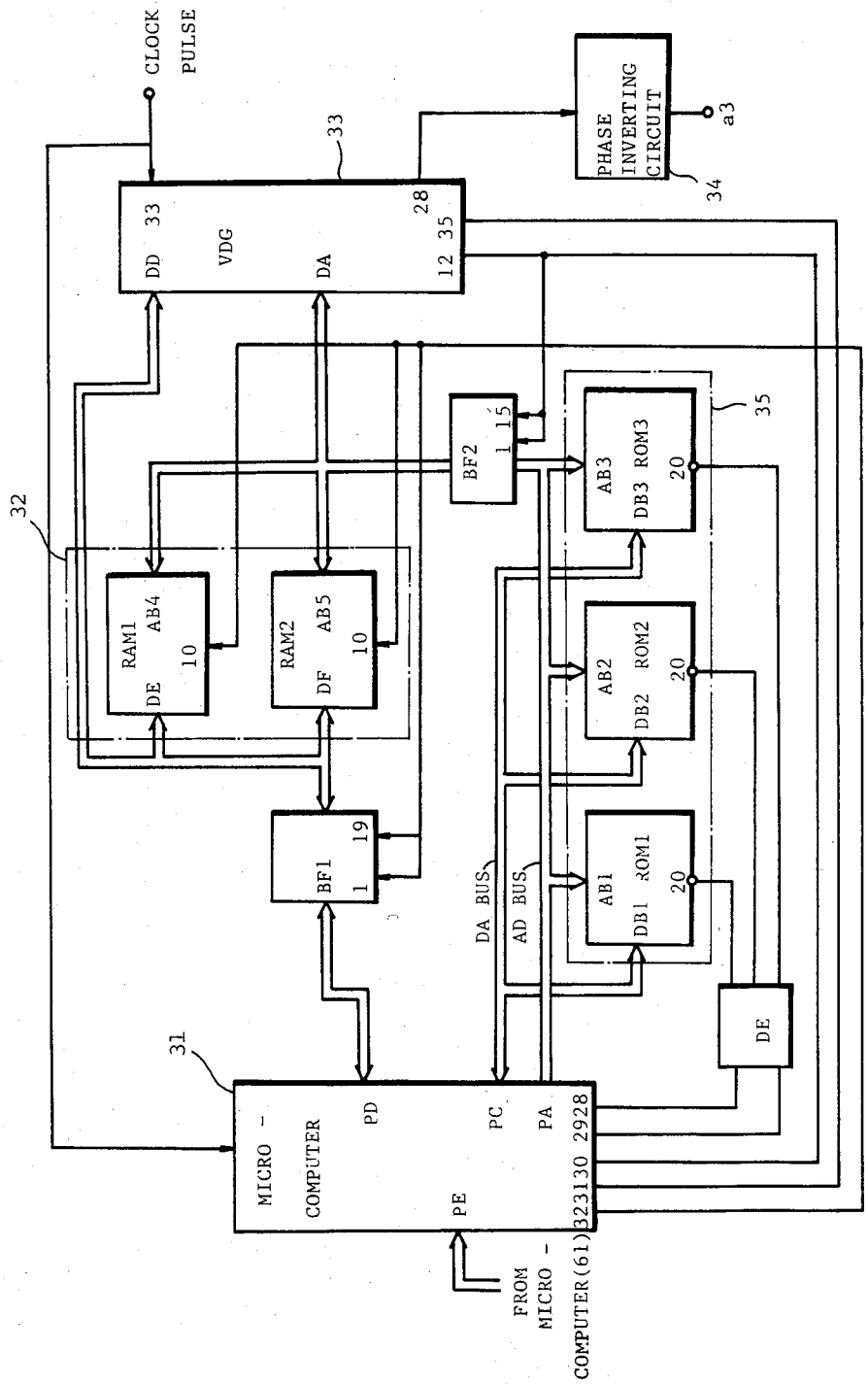
FIG. 3 is a block-diagram of the micom-video processing stage which is employed in the present invention.

The micom-video processing stage(3) is constructed concretely as shown in FIG. 3.

Figure 1:
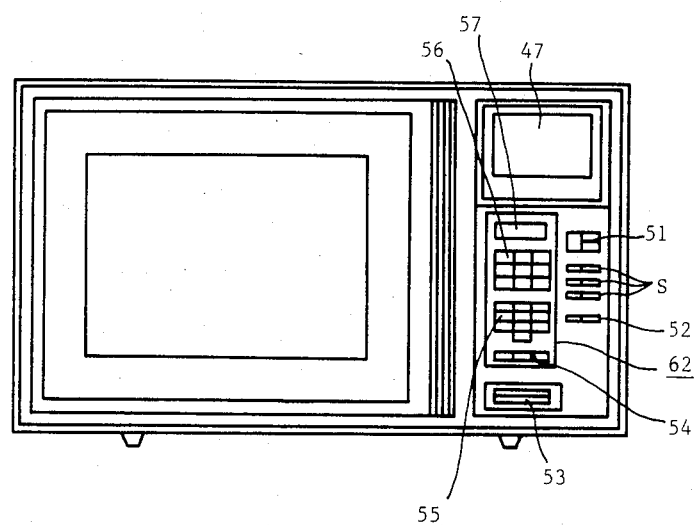
FIG. 1 is an exterior view of the microwave oven which is embodied by the present invention.

In FIG. 3, No. 31 is the micro computer, DE is the decoder, BF1 and BF2 are tri-state buffers; memory I 32 includes RAM1 and RAM2 which are random access memories for storing the cooking information temporarily, memory II 35 includes ROM1, ROM2 and ROM3 which are the read only memories for storing the cooking information permanently VDG is 33 and, 34 is the phase inverting circuit. In FIG. 1, 51 is the TV up-down switch, 52 is the TV power switch, 53 is the door open lever, 54 is the start/clear/pause switch, 55 is the numeric switch, 56 is the function switch, 57 is the digitron.

The operation of the present invention constructed as above follows:

When the operator wants to watch TV programs while cooking, he sets the moving switch of the switching stage(s) to the terminal(a1). Then the TV signal is received and processed through the antenna circuit(11), the amplifying circuit(12), the detecting circuit(13) and the image-processing stage(4).

Through this path, the operator can watch TV programs on Braun tube(47).

When the doorbell or buzzer rings and the operator wants to observe the area where he set up the video camera(21), he sets said moving switch to the terminal-(a2).

Then the video signal from the video camera(21) is applied to the video output circuit(22) and is processed in the image-processing stage(4). Therefore the operator can observe the visitor through Braun tube(47) on the front panel of the microwave oven.

The display function of the cooking information is as follows:

In the micom-video processing stage(3), on tri-state, the buffer(BF2) separates the address output of VDG(33) from the output of the port(PA) in the micro computer(31), and on the same condition(tri-state), the buffer(BF1) separates the output of the port(PD) in the micro computer(31) from the outputs of RAM1 and RAM2 when the contents of RAM1 and RAM2 are read. VDG(33) divides the clock pusle of the external 3.579545 MHz which is the same frequency as the chrominance signal and is input at the pin33 in order to generate the vertical sync. signal and horizontal sync-.signal. Then it combines sync.signals with serial signals from RAM1 and RAM2 in order to make complete video signals. When the operator wants to recognize the cooking mode which is selected on said key matrix(62), he sets the moving switch to the terminal(a3). The key matrix(62) is comprised of the function switch(56), the start/clear/pause switch(54) and the numeric switch(55). After the moving switch is set, the selected cooking mode is output from the microcomputer(61) of the microwave oven circuit(6) and is input to the port(PE) of the microcomputer(31) as 7 bits.

This input signal is automatic cooking-selector signal.

The microcomputer(31) analyzes the automatic cooking-selector signal and recognizes the memory element-(among ROM1, ROM2 and ROM3) in which the corresponding cooking information is stored.
And the microcomputer(31) also determines the enable signal which is output from the pin28 and pin29. The enable signal is applied to the proper memory element through the decoder(DE).

If the corresponding cooking information is stored in ROM1, the (31) outputs the address signal in which the initial data of the automatic cooking information are included. This address signal is transmitted to the address port(AB1) of ROM1 through the address bus line(AD BUS), and an enable signal is applied to the decoder(DE) from the pin28 and pin29. The decoder(DE) makes the pin20 of ROM1 "low state".

This "low state" changes ROM1 to the enable state.

Therefore the data of the selected cooking information are input to the port(PC) of the (31) through the data bus line(DA BUS).

When 1 Byte data is input, the (31) makes the pin20 of ROM1 into "high state" in accordance with the signal from the pin28 and pin29. Thus the transmission of the data from ROM1 is interrupted. This interruption is for storing the data by 1 Byte in RAM1 and RAM2.

Then the (31) outputs the data of the automatic cooking information from the port(PD) to the buffer(BF1). At that time, the buffer(BF1) becomes "tri-state". The buffer(BF2) also turns on by the signal which is transmitted from the pin30.

When the buffer(BF2) turns on, the address signal, which is used to store the data, is applied to the address port(AB4) (AB5) of RAM1 and RAM2 from the port-(PA) through the buffer (BF2). Then RAM1 and RAM2 operates, and the data of the automatic cooking information are written in RAM1 and RAM2.

For this operation, the pin32 of the microcomputer(31) becomes "low state", and the pin10 of RAM1 and RAM2 also becomes "low state". At the same time, the pin1 and pin19 of the buffer(BF1) become "low state" and the buffer(BF1) turns on from tri-state.

The above mentioned "WRITE" operation means that the data which are output from the port(PD) through the buffer(BF1) are stored in RAM1 and RAM2 by 4 bits separately.

When the writing of the 8 bits data is finished, the pin32 becomes "high-state". Therefore the buffer(BF1) becomes "tri-state", and RAM1 and RAM2 becomes "READ state".

Then the microcomputer(31) recognizes that all data, which are used for displaying the cooking information on the Braun tube(47), are stored in RAM1 and RAM2 completely. If the data are recognized not to be stored completely, the next address signal of the automatic cooking information is output from the port(PA) to ROM1.

This operation is a continuous "WRITE function". When the repetition of writing the data is finished, the microcomputer(31) outputs the high level-signal at the pin30 in order to turn on the VDG(33). At that time, the pin1 and pin15 of the buffer(BF2) become "high state", so that the buffer(BF2) becomes "tri-state".

When VDG(33) is turned on, the microcomputer(31) analyzes the written data in RAM1 and RAM2, and outputs a signal from pin31 to pin35 of VDG(33). This output signal is for deciding whether the video output is graphic or written.

Figure 5:
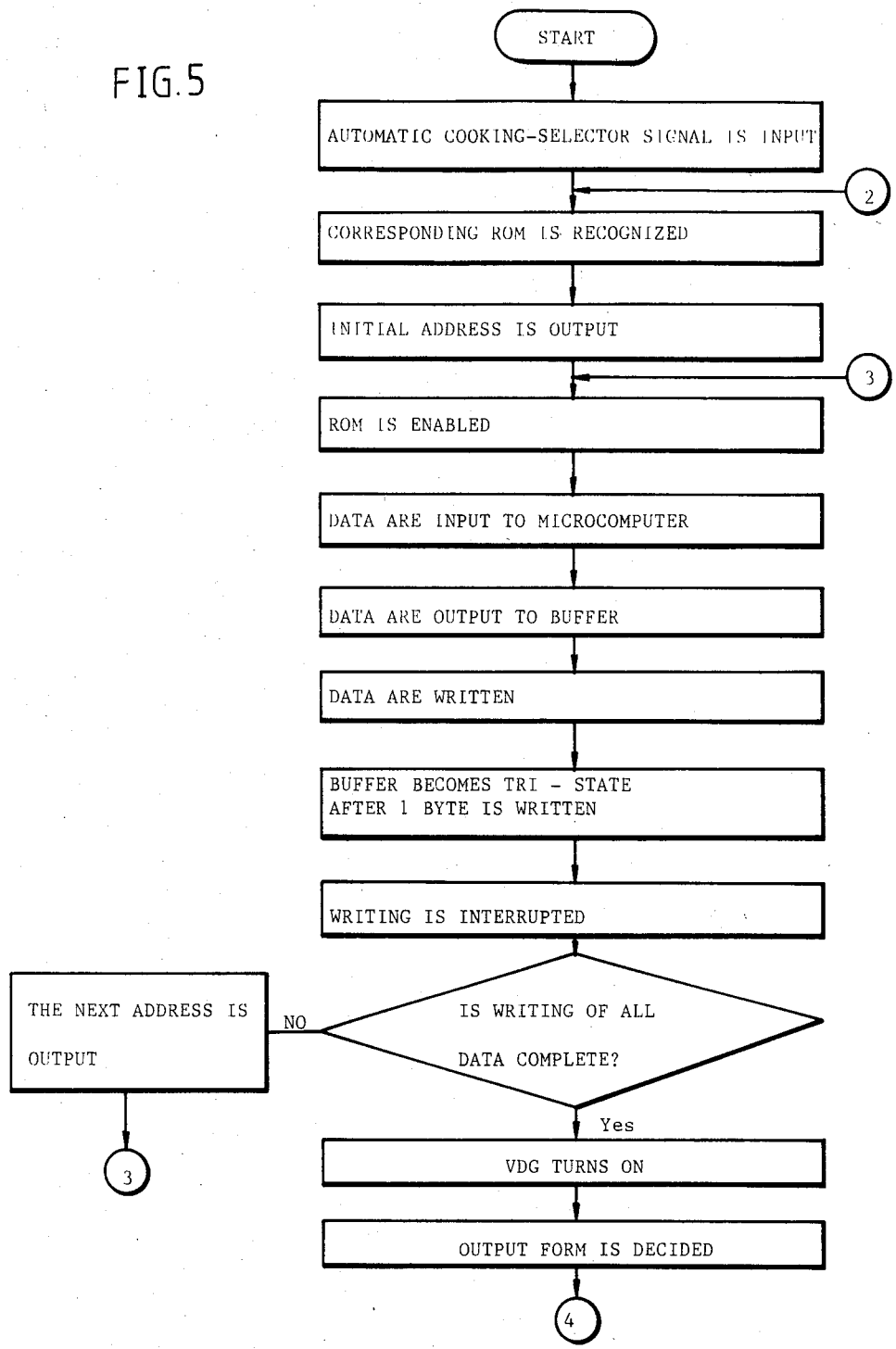
FIG. 5 and FIG. 6 are flow diagrams for depicting an operation of the present invention.

FIG. 5 shows the flow diagram of the above-mentioned operation.

The next operation is related to the video display function.

The Braun tube(47) outputs 30 video signals per second because of the characteristics of the motion picture. Therefore the repetition of signal processing which performs 30 equal routines per second is necessary.

Figure 6:
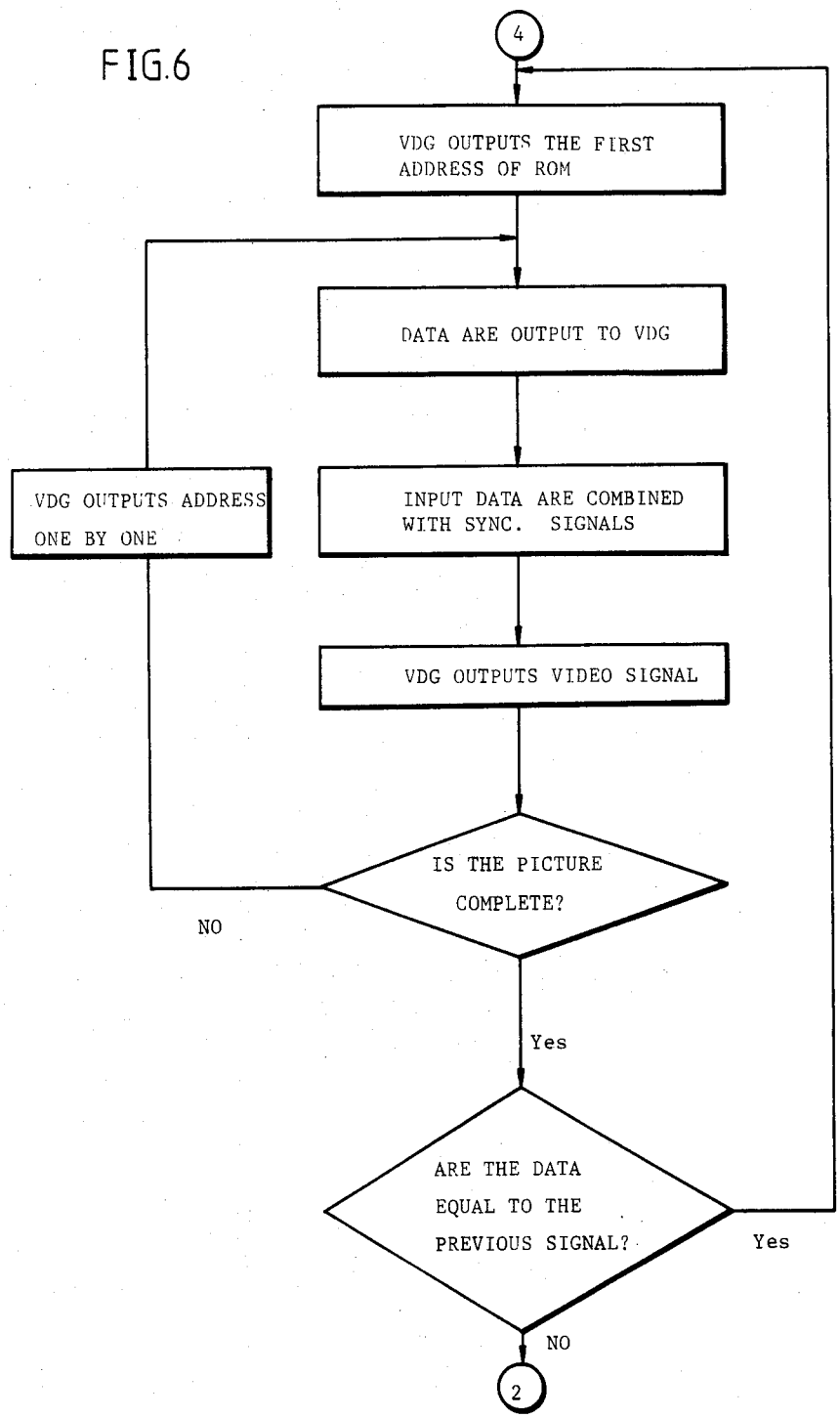

FIG. 6 shows the repetition of equal routine, the detailed explanation is as follows:

When the video output form which can be graphic or written is decided, VDG(33) outputs the first address signal from the data port(DA) to RAM1 and RAM2. RAM1 and RAM2 outputs the data of selected addresses from the port(DE)(DF) to the data port(DD) of VDG(33), These data are constructed as an ASCII code when the output form is "written" type.

Figure 4:
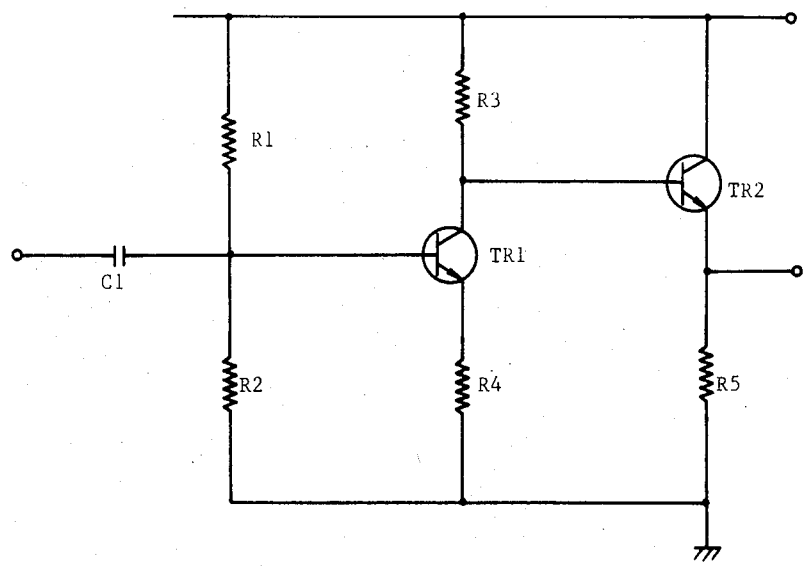
FIG. 4 is a preferred embodiment of the phase inverting circuit which is employed in the present invention.

Then VDG(33) makes the input data from RAM1 and RAM2 to a video signal. The video signal is output as a serial signal from pin28. This video signal is the combination of the horizontal, vertical sync. signals and the data of the automatic cooking information but the phase is inverted because of the characteristics of VDG(33). Thus that signal is applied to the phrase inverting circuit(34) of FIG. 4, and then it becomes the normal video signal and is displayed on the Braun tube(47) through a terminal(a3) and the image-processing stage(4).

VDG(33) recognizes whether the picture of the automatic cooking information is complete. If it is not complete, VDG(33) outputs the address signal one by one increasingly in order to make the selected data to be input into the port(DD) of VDG(33). When VDG(33) recognizes that the picture is complete, the microcomputer(31) recognizes whether the input automatic cooking selector signal is equal to the previous signal.

If the automatic cooking-selector signal is equal to the previous signal, the micro computer(31) makes VDG(33) repeat the routine by outputting the address signal of RAM1 and RAM2 from the port(DA). Therefore the video displaying operation is performed continuously. If that selector signal is not equal to the previous signal, all functions return to ② of FIG. 5. And the recognizing operation of ROM1 begins again.

Through the above mentioned procedure, the display function is performed.

The above description relates to the microwave oven which is one preferred embodiment of the present invention, however, this description does not limit the present invention. The spirit and scope of the present invention is limited by the terms of the appended claims.

I claim:

1. A cooking apparatus with a video display, comprising
   (a) a television processing means for processing a first video signal,
   (b) a camera-image processing means for processing a second video signal from a video camera,
   (c) a heat-controlling means which performs general functions of a cooking apparatus characterized in that a micro-video processing means for converting automatic cooking information into a third video signal is connected to said heat-controlling means and is adapted to monitor said cooking apparatus during a cooking cycle, and
   (d) an image-processing means for displaying said video signals, and
   (e) a switching means connected to said television processing means, said camera-image processing means and said micom-video processing means to permit switching of each means for displaying said video signal according to the user's selection.

2. The apparatus of claim 1 wherein said micom-video processing means comprises:
   (g) a microcomputer adapted to input an automatic cooking-selector signal from said heat-controlling means, and to output said automatic cooking information in the form of said third video signal,
   (h) at least one ROM adapted to store said automatic cooking information permanently,
   (i) at least one RAM adapted to store said automatic cooking information temporarily,
   (j) a decoder between said microcomputer and at least one of said ROM and said RAM,
   (k) buffers separating the output of said microcomputer and the input of a video display generator(VDG) on tri-state,
   (l) the VDG generating an inverted video signal by combining the automatic cooking information and sync. signals which are generated from an external clock pulse, and
   (m) a phase-inverting circuit for inverting said inverted video signal from said VDG.

3. The apparatus of claim 2 wherein said microcomputer controls at least one repeating function of said micom-video processing means, comprising bringing out the automatic cooking information from said ROM, storing said information in said RAM temporarily, outputting said information to the video display generator, and recognizing said automatic cooking-selector signal from said heat-controlling means.

* * * * *